(12) United States Patent
Haahr et al.

(10) Patent No.: US 8,086,619 B2
(45) Date of Patent: Dec. 27, 2011

(54) SYSTEM AND METHOD FOR PROVIDING SEARCH QUERY REFINEMENTS

(75) Inventors: Paul Haahr, San Francisco, CA (US); Steven Baker, Mountain View, CA (US)

(73) Assignee: Google Inc., Mountain View, CA (US)

( * ) Notice: Subject to any disclaimer, the term of this patent is extended or adjusted under 35 U.S.C. 154(b) by 486 days.

(21) Appl. No.: 10/668,721

(22) Filed: Sep. 22, 2003

(65) Prior Publication Data

US 2005/0055341 A1    Mar. 10, 2005

Related U.S. Application Data

(60) Provisional application No. 60/500,539, filed on Sep. 5, 2003.

(51) Int. Cl.
*G06F 17/30* (2006.01)
(52) U.S. Cl. .............. 707/765; 707/766; 707/999.003; 707/999.005; 707/999.104
(58) Field of Classification Search .................. 707/3, 5, 707/104.1, 10, 765, 766, 999.005, 999.01, 707/999.104, 999.003
See application file for complete search history.

(56) References Cited

U.S. PATENT DOCUMENTS

| | | | |
|---|---|---|---|
| 5,056,021 A | | 10/1991 | Ausborn |
| 5,488,725 A | | 1/1996 | Turtle et al. |
| 6,006,225 A | * | 12/1999 | Bowman et al. ............ 1/1 |
| 6,026,388 A | * | 2/2000 | Liddy et al. ............. 707/1 |
| 6,173,275 B1 | | 1/2001 | Caid et al. |
| 6,285,999 B1 | | 9/2001 | Page |
| 6,446,061 B1 | | 9/2002 | Doerre et al. |
| 6,510,406 B1 | | 1/2003 | Marchisio |
| 6,560,597 B1 | | 5/2003 | Dhillon et al. |
| 6,675,159 B1 | | 1/2004 | Lin et al. |
| 6,701,305 B1 | * | 3/2004 | Holt et al. ............. 706/45 |
| 6,711,585 B1 | | 3/2004 | Copperman et al. |

(Continued)

FOREIGN PATENT DOCUMENTS

JP    2000-227922 A    8/2000

(Continued)

OTHER PUBLICATIONS

Tomoe Tomiyama et al.; "Concept-Based Web Communities for Google Search Engine"; 2003 IEEE; The IEEE International Conference on Fuzzy Systems; pp. 1122-1128.*

(Continued)

*Primary Examiner* — Apu Mofiz
*Assistant Examiner* — Monica M Pyo
(74) *Attorney, Agent, or Firm* — Harrity & Harrity, LLP

(57) ABSTRACT

A system and method for providing search query refinements are presented. A stored query and a stored document are associated as a logical pairing. A weight is assigned to the logical pairing. The search query is issued and a set of search documents is produced. At least one search document is matched to at least one stored document. The stored query and the assigned weight associated with the matching at least one stored document are retrieved. At least one cluster is formed based on the stored query and the assigned weight associated with the matching at least one stored document. The stored query associated with the matching at least one stored document are scored for the at least one cluster relative to at least one other cluster. At least one such scored search query is suggested as a set of query refinements.

52 Claims, 11 Drawing Sheets

U.S. PATENT DOCUMENTS

| | | | |
|---|---|---|---|
| 6,732,088 B1 | 5/2004 | Glance | 707/3 |
| 6,823,333 B2 * | 11/2004 | McGreevy | 707/4 |
| 7,130,849 B2 * | 10/2006 | Yayoi et al. | 707/5 |
| 2003/0014399 A1 * | 1/2003 | Hansen et al. | 707/3 |

FOREIGN PATENT DOCUMENTS

| | | |
|---|---|---|
| JP | 2001-202390 | 7/2001 |
| JP | 2002-324077 A | 11/2002 |

OTHER PUBLICATIONS

Yo-Ping Huang et al.; "A Fuzzy Feature Clustering with Relevance Feedback Approach to Content-Based Image Retrieval"; VECIMS 2003—International Symposium on Virtual Environmentts, Human-Computer Interfaces, and Measurement Systems; Lugano, Switzerland, Jul. 27-29, 2003; pp. 57-62.*

Christina Yip Chung et al, "Thematic Mapping—From Unstructured Documents to Taxonomies," CIKM'02, Nov. 4-9, 2002, pp. 608-610, ACM, McLean, Virginia, USA.

Hiroyuki Kawano, "Overview of Mondou Web Search Engine Using Text Mining and Information Visualizing Technologies," IEEE, 2001, pp. 234-241.

James Osborn et al "JUSTICE: A Judicial Search Tool Using Intelligent Concept Extraction," ICAIL-99, 1999, pp. 173-181, ACM.

Chen An et al "Fuzzy Concept Graph and Application in Web Document Clustering," 2001, pp. 101-106, IEEE.

International Search Report from corresponding PCT application; mail date Feb. 18, 2005; 5 pages.

Natalie S. Glance; Community Search Assistant; Proceedings of the $6^{th}$ International Conference on Intelligent User Interfaces; Jan. 14-17, 2001; pp. 91-96.

Hang Cui et al.; Probabilistic Query Expansion Using Query Logs; Proceedings of the $11^{th}$ International Conference on World Wide Web; May 7-11, 2002; 18 pages.

Ji-Rong Wen et al.; Clustering User Queries of a Search Engine; Proceedings of the $10^{th}$ International Conference on World Wide Web; May 1-5, 2001; pp. 162-168.

Ji-Rong Wen et al.; Clustering User Queries of a Search Engine; Proceedings of the $10^{th}$ International Conference on World Wide Web; May 1-5, 2001; 14 pages.

Doug Beeferman et al; Agglomerative Clustering of a Search Engine Query Log; Proceedings of the $6^{th}$ ACM SIGKDD International Conference on Knowledge and Discovery and Data Mining; Aug. 2000; 10 pages.

Larry Fitzpatrick et al.; Automatic Feedback Using Past Queries: Social Searching?; Proceedings of the $20^{th}$ Annual International ACM SIGIR Conference on Research and Development in Information Retrieval; Jul. 1997 (print date); pp. 306-313.

Edie Rasmussen; "Information Retrieval: Data Structures and Algorithms"; Prentice Hall, 1992; pp. 419-442.

F. Scholer and H. E. Williams: "Query Association for Effective Retrieval", School of Computer Science and Information Technology, RMIT University, Melbourne, Australia, 2002, 8 pages.

* cited by examiner

SYSTEM AND METHOD FOR PROVIDING SEARCH QUERY REFINEMENTS

CROSS-REFERENCE TO RELATED APPLICATION

This non-provisional patent application claims priority under 35 USC §119(e) to U.S. provisional patent application Ser. No. 60/500,539, filed Sep. 5, 2003, the disclosure of which is incorporated by reference.

FIELD OF THE INVENTION

The present invention relates in general to query processing and, in particular, to a system and method for providing search query refinements.

BACKGROUND OF THE INVENTION

Although the Internet traces back to the late 1960s, the widespread availability and acceptance of personal computing and internetworking have resulted in the explosive growth and unprecedented advances in information sharing technologies. In particular, the Worldwide Web ("Web") has revolutionized accessibility to untold volumes of information in stored electronic form to a worldwide audience, including written, spoken (audio) and visual (imagery and video) information, both in archived and real-time formats. In short, the Web has provided desktop access to every connected user to a virtually unlimited library of information in almost every language worldwide.

Search engines have evolved in tempo with the increased usage of the Web to enable users to find and retrieve relevant Web content in an efficient and timely manner. As the amount and types of Web content have increased, the sophistication and accuracy of search engines have likewise improved. Generally, search engines strive to provide the highest quality results in response to a search query. However, determining quality is difficult, as the relevance of retrieved Web content is inherently subjective and dependent upon the interests, knowledge and attitudes of the user.

Existing methods used by search engines are based on matching search query terms to terms indexed from Web pages. More advanced methods determine the importance of retrieved Web content using, for example, a hyperlink structure-based analysis, such as described in S. Brin and L. Page, "The Anatomy of a Large-Scale Hypertextual Search Engine," (1998) and in U.S. Pat. No. 6,285,999, issued Sep. 4, 2001 to Page, the disclosures of which are incorporated by reference.

A typical search query scenario begins with either a natural language question or individual terms, often in the form of keywords, being submitted to a search engine. The search engine executes a search against a data repository describing information characteristics of potentially retrievable Web content and identifies the candidate Web pages. Searches can often return thousands or even millions of results, so most search engines typically rank or score only a subset of the most promising results. The top Web pages are then presented to the user, usually in the form of Web content titles, hyperlinks, and other descriptive information, such as snippets of text taken from the Web pages.

Providing quality search results can be complicated by the literal and implicit scope of the search query itself. A poorly-framed search query could be ambiguous or be too general or specific to yield responsive and high quality search results. For instance, terms within a search query can be ambiguous at a syntactic or semantic level. A syntactic ambiguity can be the result of an inadvertent homonym, which specifies an incorrect word having the same sound and possibly same spelling, but different meaning from the word actually meant. For example, the word "bear" can mean to carry or can refer to an animal or an absence of clothing. A semantic ambiguity can be the result of improper context. For example, the word "jaguar" can refer to an animal, a version of the Macintosh operating system, or a brand of automobile. Similarly, search terms that are too general result in overly broad search results while search terms that are too narrow result in unduly restrictive and non-responsive search results.

Accordingly, there is a need for an approach to providing suggestions for search query refinements that will resolve ambiguities or over generalities or over specificities occurring in properly framed search queries. Preferably, such an approach would provide refined search queries that, when issued, result in search results closely related to the actual topic underlying the intent of the original search query and provide suggestions that reflect conceptual independence and clear meanings as potential search terms.

SUMMARY OF THE INVENTION

An embodiment provides a system and method for creating query refinement suggestions. At least one search document retrieved responsive to a query is matched to one or more stored queries. The stored query is scored as a potential query refinement suggestion.

A further embodiment provides a system and method for providing search query refinements. A stored query and a stored document are associated as a logical pairing. A weight is assigned to the logical pairing. The search query is issued and a set of search documents is produced, for example, by a searcher. At least one search document is matched to at least one stored document. The stored query and the assigned weight associated with the matching at least one stored document are retrieved. At least one cluster is formed based on the stored query and the assigned weight associated with the matching at least one stored document. The stored query associated with the matching at least one stored document are scored for the at least one cluster relative to at least one other cluster. At least one such scored search query is suggested as a set of query refinements.

A further embodiment provides a system and method for integrating query refinement candidates. At least one search document retrieved responsive to a query is matched to one or more stored documents associated with a stored query and weight. At least one cluster is formed based on the stored query and weight associated with each stored document matched responsive to the query. At least one further search document retrieved responsive to a candidate query is matched to the one or more stored documents. At least one further cluster is formed based on the stored query and weight associated with each stored document matched responsive to the candidate query. The at least one cluster and the at least one further cluster are combined. The stored query for the combined cluster relative to at least one other cluster is scored as a potential query refinement suggestion.

Still other embodiments of the present invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from

DETAILED DESCRIPTION

System Overview

Figure 1:
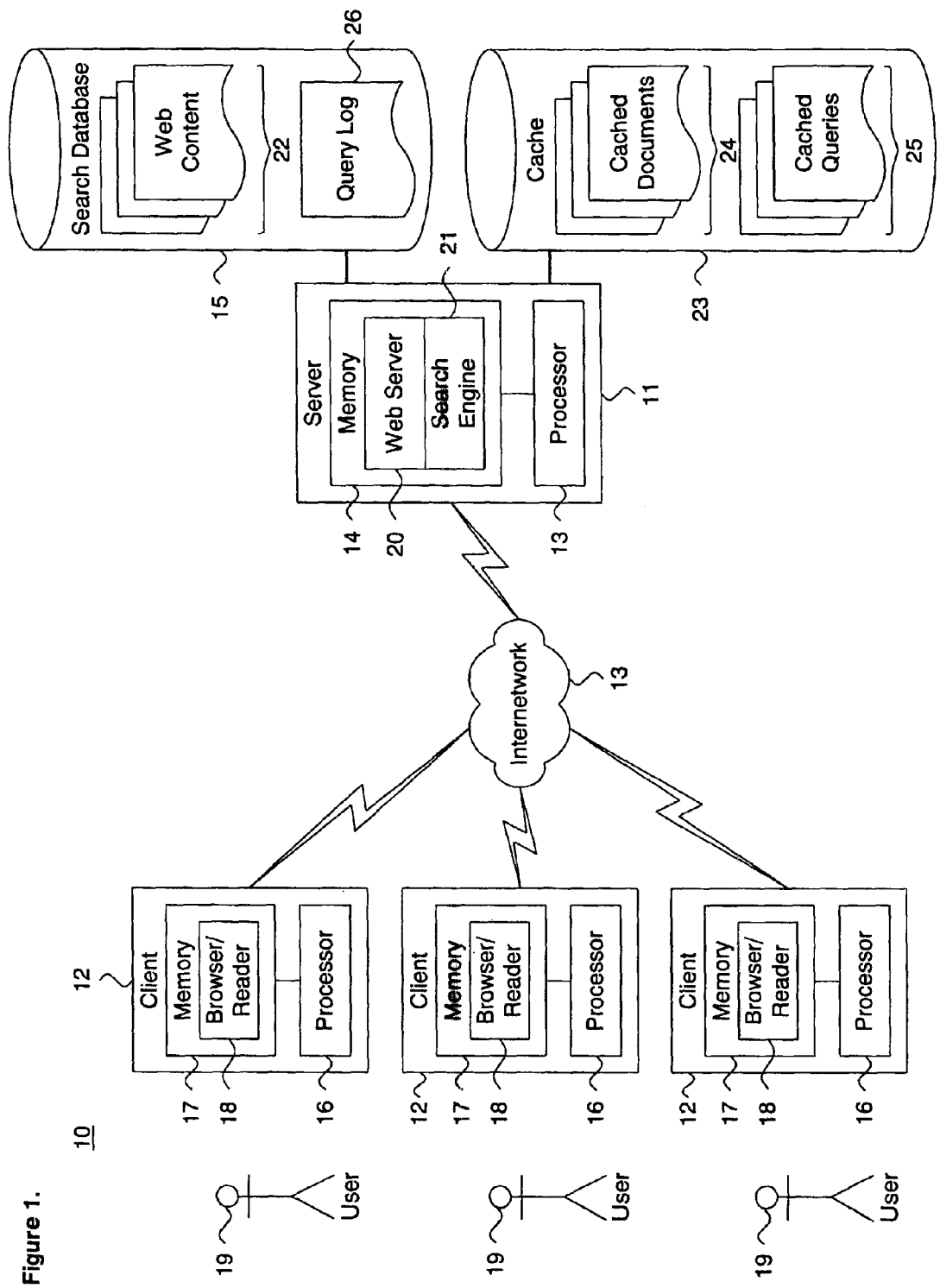
FIG. 1 is a block diagram showing a system for providing search query refinements, in accordance with the present invention.

FIG. 1 is a block diagram showing a system 10 for providing search query refinements, in accordance with the present invention. A plurality of individual clients 12 are communicatively interfaced to a server 11 via an internetwork 13, such as the Internet, or other form of communications network, as would be recognized by one skilled in the art. The individual clients 12 are operated by users 19 who transact requests for Web content and other operations through their respective client 12.

In general, each client 12 can be any form of computing platform connectable to a network, such as the internetwork 13, and capable of interacting with application programs. Exemplary examples of individual clients include, without limitation, personal computers, digital assistances, "smart" cellular telephones and pagers, lightweight clients, workstations, "dumb" terminals interfaced to an application server, and various arrangements and configurations thereof, as would be recognized by one skilled in the art. The internetwork 13 includes various topologies, configurations, and arrangements of network interconnectivity components arranged to interoperatively couple with enterprise, wide area and local area networks and include, without limitation, conventionally wired, wireless, satellite, optical, and equivalent network technologies, as would be recognized by one skilled in the art.

For Web content exchange and, in particular, to transact searches, each client 12 executes a Web browser 18 ("Web browser"), which preferably implements a graphical user interface and through which search queries are sent to a Web server 20 executing on the server 11. Each search query describes or identifies information, generally in the form of Web content, which is potentially retrievable via the Web server 20. The search query provides search characteristics, typically expressed as individual terms, such as keywords and the like, and attributes, such as language, character encoding and so forth, which enables a search engine 21, also executing on the server 11, to identify and send back search result documents, generally in the form of Web pages. Other styles, forms or definitions of search queries and characteristics are feasible, as would be recognized by one skilled in the art.

The Web pages are sent back to the Web browser 18 for presentation, usually in the form of Web content titles, hyperlinks, and other descriptive information, such as snippets of text taken from the Web pages. The user can view or access the Web pages on the graphical user interface and can input selections and responses in the form of typed text, clicks, or both. The server 11 maintains a search database 15 in which Web content 22 is maintained. The Web content 22 could also be maintained remotely on other Web servers (not shown) interconnected either directly or indirectly via the internetwork 13 and which are preferably accessible by each client 12. In a further embodiment, the server 11 maintains a cache 23 in which cached documents 24 and cached queries 25 are maintained. The cache 23 associates each cached document 24 with one or more cached queries 25 to improve searching performance, as is known in the art. Finally, in a still further embodiment, the search engine 21 maintains a query log 26 in which records of previous search queries 27 are tracked.

The search engine 21 preferably identifies the Web content 22 best matching the search characteristics to provide high quality Web pages, such as described in S. Brin and L. Page, "The Anatomy of a Large-Scale Hypertextual Search Engine" (1998) and in U.S. Pat. No. 6,285,999, issued Sep. 4, 2001 to Page, the disclosures of which are incorporated by reference. In identifying matching Web content 22, the search engine 21 operates on information characteristics describing potentially retrievable Web content. Note the functionality provided by the server 20, including the Web server 20 and search engine 21, could be provided by a loosely- or tightly-coupled distributed or parallelized computing configuration, in addition to a uniprocessing environment.

Search queries can potentially be ambiguous or lack generality or specificity. Such poorly-framed search queries can be remedied through search query refinements, which can be provided in response to search query issuances. Search query refinements are generated and suggested as a two-part operation. First, a search query is associated with a search result document in a one-to-one association and a weight is assigned to each search query-search result document association, as further described below with reference to FIG. 2. Second, the search query-search result document associations and assigned weights are matched to at least one new search query to form scored clusters, as further described below with reference to FIG. 3. The clusters are projected from multi-dimensional space based on constituent query terms and unique search queries associated with any document in each cluster are scored. The clusters are named based on the scoring, preferably by highest scores. The named clusters are sorted and provided as suggested refinements to the original search query.

The individual computer systems, including server 11 and clients 12, include general purpose, programmed digital computing devices consisting of a central processing unit (processors 13 and 16, respectively), random access memory (memories 14 and 17, respectively), non-volatile secondary storage, such as a hard drive or CD ROM drive, network or wireless interfaces, and peripheral devices, including user interfacing means, such as a keyboard and display. Program code, including software programs, and data is loaded into the RAM for execution and processing by the CPU and results are generated for display, output, transmittal, or storage. The Web browser 18 is an HTTP-compatible Web browser, such as the Internet Explorer, licensed by Microsoft Corporation, Redmond, Wash.; Navigator, licensed by Netscape Corporation, Mountain View, Calif.; or other forms of Web browsers, as are known in the art.

Precomputation Server

Figure 2:
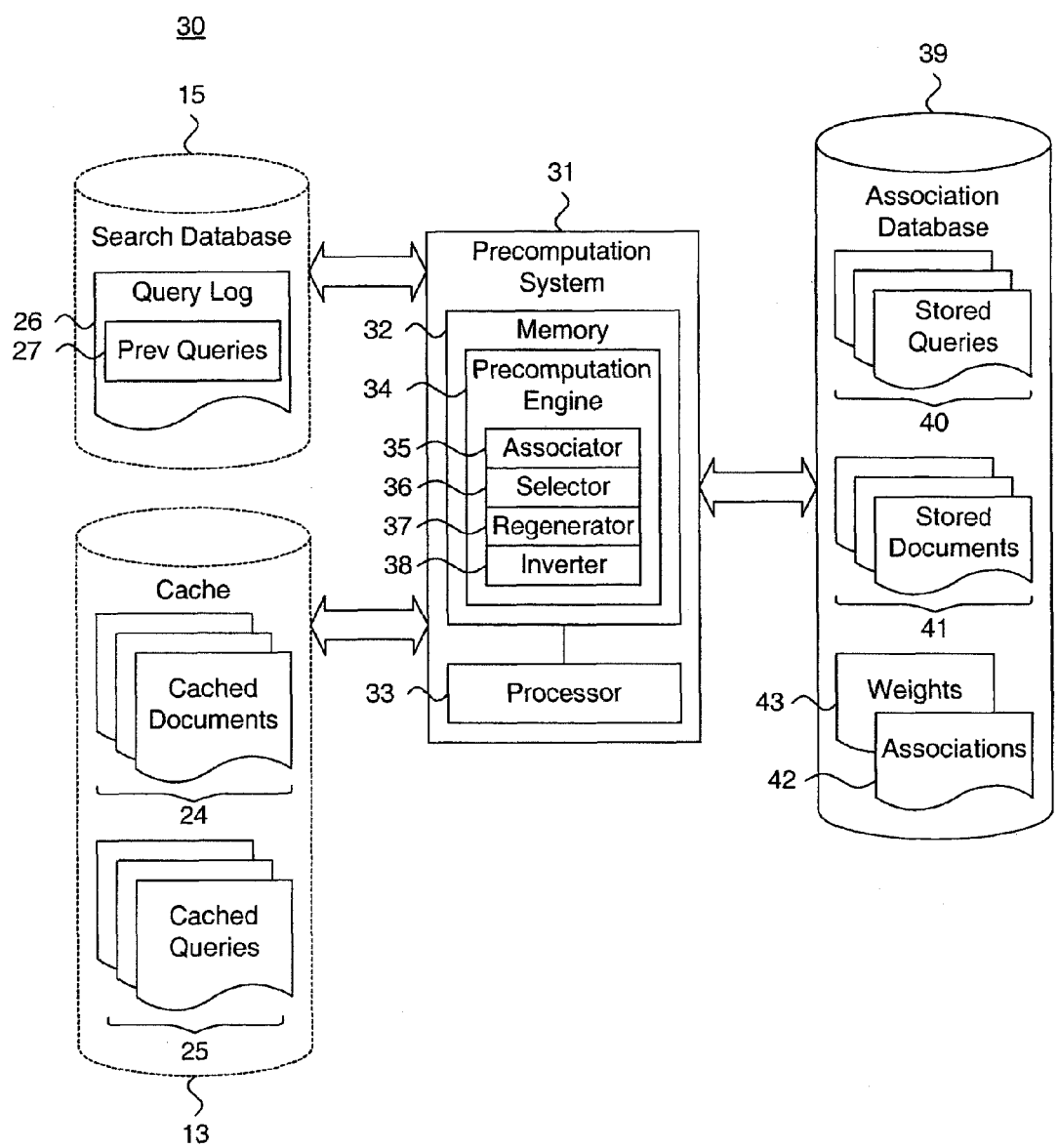
FIG. 2 is a functional block diagram showing a precomputation server, in accordance with the present invention.

FIG. 2 is a functional block diagram 30 showing a precomputation server 34, in accordance with the present invention. The precomputation system 31 builds a set of associated queries and documents, preferably as an off-line operation. The precomputation system 31 includes a precomputation engine 34, which associates a stored query 40 with a stored document 41 and assigns a weight 43 to each association 42, as further described below with reference to FIG. 5.

The precomputation system 31 builds and maintains the association database 39. The association database 39 stores the stored queries 40, stored documents 41, associations 42, and weights 43, which are used by a query refinement server to formulate and suggest query refinements, as further described below with reference to FIG. 3. In further embodiments, the precomputation system 31 also references the query log 26, which is stored in the search database 15, and the cached documents 24 and cached queries 25, which are stored in the cache (both shown in FIG. 1).

The precomputation engine 34 logically includes four modules. Other logical arrangements and definitions of functional modules are possible, as would be recognized by one skilled in the art. First, an associator 35 associates a stored query 40 with a stored document 41 and the stored query-stored document pairing is maintained in the association database 39 as a set of associations 42. Each stored query 40 is associated with only one stored document 41, although any given stored query 40 can be paired with one or more stored documents 41 in a one-to-many relationship. Each individual pairing is maintained as a separate association 42 in the association database 39. However, the individual pairings need not be explicitly stored in the form of associations 42 and can instead be logically recorded or tracked, such as by using a mapping, table or other means for matching stored queries 40 with stored documents 41, as would be recognized by one skilled in the art.

The associator 35 also assigns a weight 43 to each association 42. Each weight 43 estimates the relevance of the stored document 41 to the associated stored query 40. When multiple associations 42 for the same stored query-stored document pairing occurs, the weights 43 for each of the multiple associations 42 are summed. If query frequency data is available, such as, for example, when a search query 59 is cached, the weight 43 is multiplied by the search query frequency, that is, the number of times that the search query 59 has been issued.

Second, a selector 36 selects one or more of the stored documents 41 for association with a stored query 40 based on an issued search. In the described embodiment, the selector 36 selects the stored documents 41, which are each separately associated with a stored query 40 based on either a search document chosen following an issued search or from a set of search results received for an issued search, as further described below respectively with reference to FIGS. 6 and 7.

Third, the regenerator 37 selects one or more of the stored documents 41, which are each separately associated with a stored query 40 based on the query log 26. In a further embodiment, the regenerator 37 regenerates the search results from previously tracked queries 27, as reflected in the query log 26. The regenerator 37 selects the regenerated search results as stored documents 41, which are each separately associated with a previously tracked search query 27, as further described below with reference to FIG. 8.

Fourth, the inverter 38 selects one or more of the stored documents, which are each separately associated with a stored query 40 based on cached data. In a still further embodiment, the inverter 38 evaluates the cached documents 24 and cached queries 25 and inverts the cached document-cached queries pairings into cached query-cached documents pairings. The inverter 38 selects the inverted cached documents 24 as stored documents 41, which are each separately associated with a cached query 25, as further described below with reference to FIG. 9.

The individual computer system, including the precomputation system 31, include general purpose, programmed digital computing devices consisting of a central processing unit (processor 33), random access memory (memory 32), non-volatile secondary storage, such as a hard drive or CD ROM drive, network or wireless interfaces, and peripheral devices, including user interfacing means, such as a keyboard and display. Program code, including software programs, and data is loaded into the RAM for execution and processing by the CPU and results are generated for display, output, transmittal, or storage. Note the functionality provided by the precomputation system 31 could be provided by a loosely- or tightly-coupled distributed or parallelized computing configuration, in addition to a uniprocessing environment.

Query Refinement Server

Figure 3:
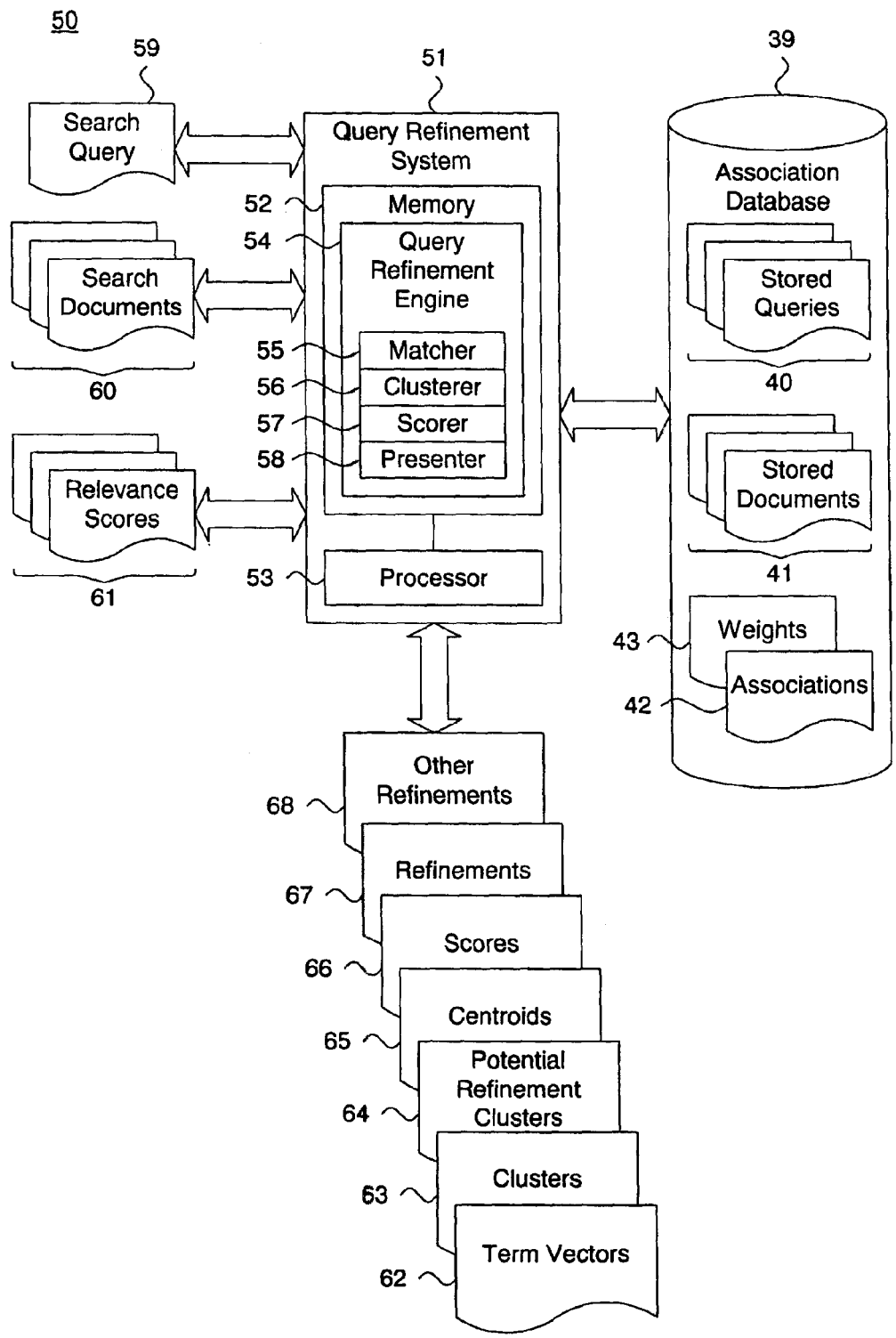
FIG. 3 is a functional block diagram showing a query refinement server, in accordance with the present invention.

FIG. 3 is a functional block diagram 50 showing a query refinement system 51, in accordance with the present invention. The query refinement system 51 formulates and suggests one or more query refinements 67. The query refinements can be formulated either as an on-line operation following a search query issuance or based on precomputations for a given set of search queries. The query refinement system 51 includes a query refinement engine 54, which formulates the query refinements 67 as suggestions in response to an actual search query 59, as further described below with reference to FIG. 10, and which integrates candidate query refinements 68, as further described below with reference to FIG. 11.

The query refinement engine 54 logically includes four modules. Other logical arrangements and definitions of functional modules are possible, as would be recognized by one skilled in the art. First, a matcher 55 matches one or more of the stored documents 41 to the actual search documents 60, generated by the search engine 21 (shown in FIG. 1) in response to the issuance of a search query 59. The search engine 21 also generates relevance scores 60 as part of the search query issuance. The matcher 55 identifies the stored queries 40 and assigned weights 43 using the associations 43 corresponding to the matched stored documents 41.

Second, a clusterer 56 forms one or more clusters 62 based on term vectors 62 formed from the terms occurring in the matched stored queries 40 and corresponding weights 43. The term vectors 62 are normalized vectors projected into multi-dimensional space, with each dimension corresponding to a term, which can be an individual word or word combination. The clusters 62 are ranked based on the relevance scores 61 assigned to the search documents 60 corresponding to the matched stored documents 41 and the number of stored documents 41 occurring in each cluster 62. The highest ranking clusters 62 are selected as potential refinement clusters 64. In the described embodiment, the clusters 62 are formed using a hierarchical agglomerative clustering algorithm, such as described in E. Rasmussen, "Clustering Algorithms," in "Information Retrieval," (W. Frakes & R. Baeza-Yates eds. 1992), the disclosure of which is incorporated by reference, although other types of clustering algorithms could be used, as would be recognized by one skilled in the art.

Third, a scorer 57 computes center-weighted term vectors, referred to as centroids 65, which each represent the weighted center of the term vector 62 of each cluster 63. The centroids 65 are computed from each of the potential refinement clusters 64. The scorer 57 assigns scores 66 to each unique search query in each of the potential refinement clusters 64 based on the number of stored documents 41 with which the search query is associated and the distance from the centroid 65. Other approaches to computing centroids 65 could also be used, including using unweighted values and by varying the forms of weighting and averaging, as would be recognized by one skilled in the art.

Finally, a presenter 58 identifies the substantially highest scoring search queries as one or more query refinements 67 to the user 19. Importantly, the details of the formulation of the search query refinements, including the term vectors 62, clusters 63, potential refinement clusters 64, centroids 65, and scores 66, are encapsulated by the query refinement engine 54. Thus, a user 19 will only be aware of the actual suggested query refinements 67.

The individual computer system, including the query refinement system 51, include general purpose, programmed digital computing devices consisting of a central processing unit (processor 53), random access memory (memory 52), non-volatile secondary storage, such as a hard drive or CD ROM drive, network or wireless interfaces, and peripheral devices, including user interfacing means, such as a keyboard and display. Program code, including software programs, and data is loaded into the RAM for execution and processing by the CPU and results are generated for display, output, transmittal, or storage. Note the functionality provided by the query refinement system 51 could be provided by a loosely- or tightly-coupled distributed or parallelized computing configuration, in addition to a uniprocessing environment.

Method Overview

Figure 4:
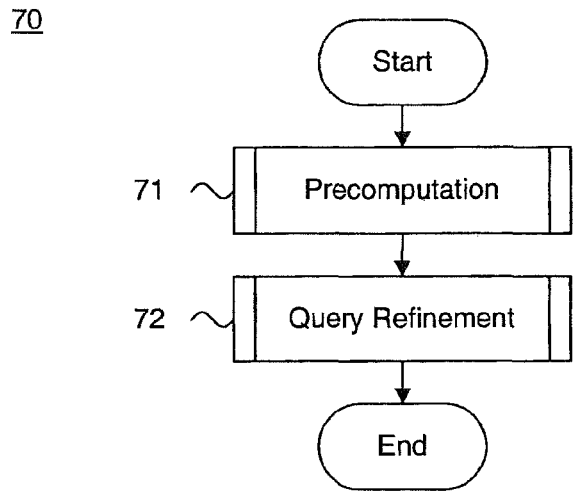
FIG. 4 is a flow diagram showing a method for providing search query refinements, in accordance with the present invention.

FIG. 4 is a flow diagram showing a method 70 for providing search query refinements, in accordance with the present invention. The method 70 is described as a sequence of process operations or steps, which can be executed, for instance, by the precomputation engine 34 of FIG. 2 and the query refinement engine 54 of FIG. 3, or equivalent components.

The method 70 performs precomputation (Block 71) and query refinement (Block 72). Precomputation (Block 71) builds the association database 39 (shown in FIG. 2) by associating and storing representative stored queries 40 with stored documents 41, along with associations 42 and weights 43, as further described below with reference to FIG. 5. In the described embodiment, precomputation is performed as an off-line operation independent of any specific search query.

Query refinement (Block 72) formulates query refinement suggestions structured to better frame search queries posted by users. In one embodiment, the query refinement suggestions are performed as an on-line operation based on search query results observed for issued search queries, which can be matched and applied to the data maintained in the association database 39, as further described below with reference to FIG. 10. In a further embodiment, candidate query refinements 68 can be integrated into query refinement suggestions, which can also be matched and applied to the data maintained in the association database 39, as further described below with reference to FIG. 11.

The method terminates upon the completion of the last query refinement operation.

Precomputation Routine

Figure 5:
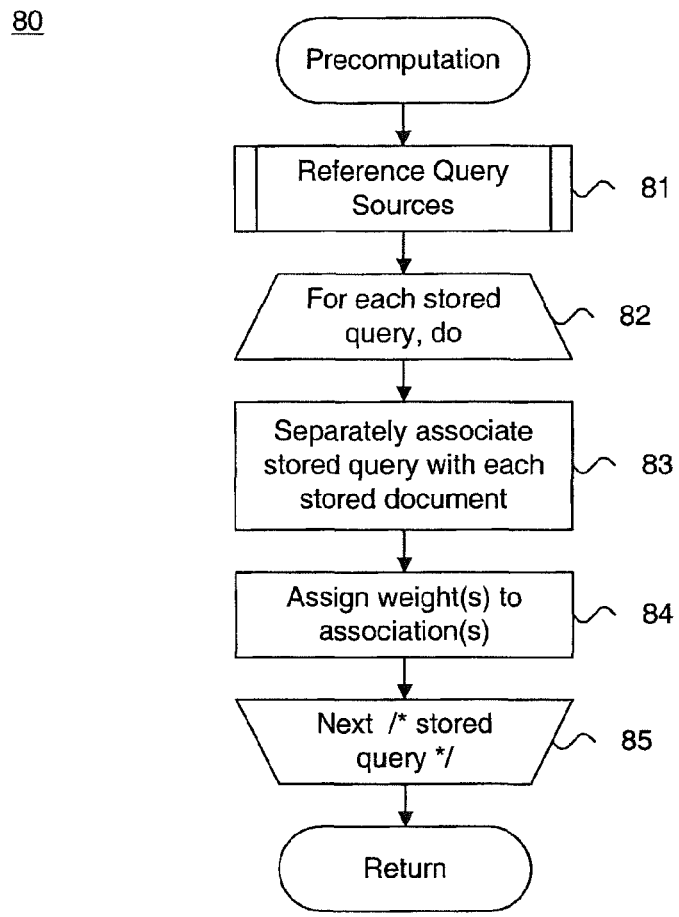
FIG. 5 is a flow diagram showing the routine for performing precomputation for use in the method of FIG. 4.

FIG. 5 is a flow diagram showing the routine 80 for performing precomputation for use in the method 70 of FIG. 4. The purpose of this routine is to build the association database 39 (shown in FIG. 3) and associate stored queries 40 with stored documents 41 to form associations 42 and assign weights 43.

Initially, query sources are referenced to build the stored queries 40 and stored documents 41 maintained in the association database 39. Briefly, query source referencing refers to identifying appropriate pairings of search queries and search result documents based on actual search query issuances, including current, stored and cached search query issuances. Thus, the stored queries 40 can originate from actual search queries, as further described below with reference to FIGS. 6 and 7, previous search queries 27 tracked in the query log 26, as further described below with reference to FIG. 8, and cached queries 25 maintained in the cache 13, as further described below with reference to FIG. 9. In addition, the stored documents 41 can be search documents 60 retrieved in response to actual search queries 59, or can be regenerated search results or cached documents 24 maintained in the cache 13. Other sources of search queries and documents for association as stored queries 40 and stored documents 41 are possible, as would be recognized by one skilled in the art.

Once the stored queries 40 for the association database 39 have been identified and stored, each stored query 40 is iteratively processed (Block 82), as follows. A stored query 40 is separately associated with each stored document 41 (Block 83). A one-to-one association 42 is formed, provided, however, that each associated stored document 41 is based on the issuance of the corresponding associated stored query 40. Each stored query 40 is separately associated with only one stored document 41, although any given stored query 40 can be paired with one or more stored documents 41 in a one-to-many relationship. A weight 43 is assigned to the association 42 (Block 84), reflecting the relevance of the stored document 41 to the stored query 40. Processing continues with each remaining stored query 40 (Block 85), after which the routine returns.

Query Source Referencing Routines

FIGS. 6-9 are flow diagrams showing the routines for referencing query sources for use in the method 80 of FIG. 5. The purposes of these routines are to populate the stored queries 40 and stored documents 41 maintained in the association database 39. Each of the routines identifies search queries 59 and related search documents 60, respectively for use as stored queries 40 and stored documents 41.

Each stored query 40 in an association 42 is associated with a stored document 41, although any given stored query 40 can be paired with one or more stored documents 41 in a one-to-many relationship. Each individual pairing is maintained as a separate association 42. However, the individual pairings need not be explicitly stored in the form of associations 42 and can be logically recorded or tracked, such as by using a mapping, table or other means for matching stored queries 40 with stored documents 41, as would be recognized by one skilled in the art.

In the association database, each of the stored queries 40 take the form of a search query 59 expressed as, for instance, keywords or terms. Terms include individual words or combinations of words. Each of the stored documents 41 are preferably stored as references and not as actual content. Generally, each stored document 41 can be in the form of, by way of example, a uniform resource locator (URL), hyperlink, anchor, or document excerpt.

Query Source Referencing Using a Chosen Search Document

Figure 6:
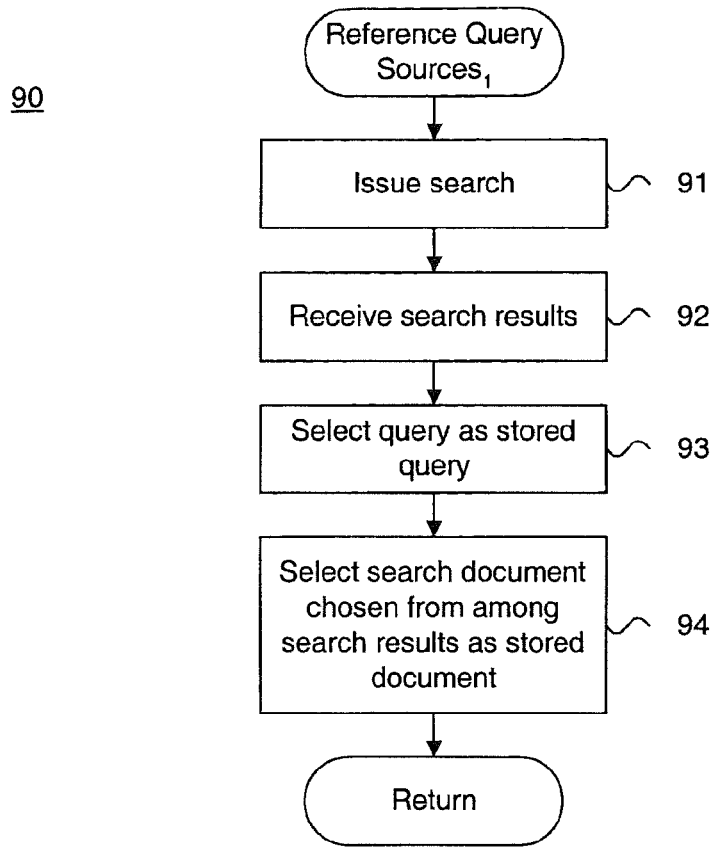
FIGS. 6-9 are flow diagrams showing the routines for referencing query sources for use in the method of FIG. 5.

FIG. 6 is a flow diagram showing a routine 90 for performing precomputation based on a chosen search document. The purpose of this routine is to identify a one-to-one pairing relationship between a search query 59 and a selected search document 60. The one-to-one relationship can occur, for instance, when a user 19 selects a particular search document 60 from among a set of search results following the issuance of a search query 59.

First, a search query 59 is issued (Block 91) and search results, consisting of search documents 60 (shown in FIG. 3), are received (Block 92). The actual search query 59 is selected as the stored query 40 (Block 93). A search document 59 is selected as a stored document 41, when the search document 59 is chosen by the user 19 performing the search from among the search results (Block 94). The routine then returns.

Query Source Referencing Using Search Results

Figure 7:
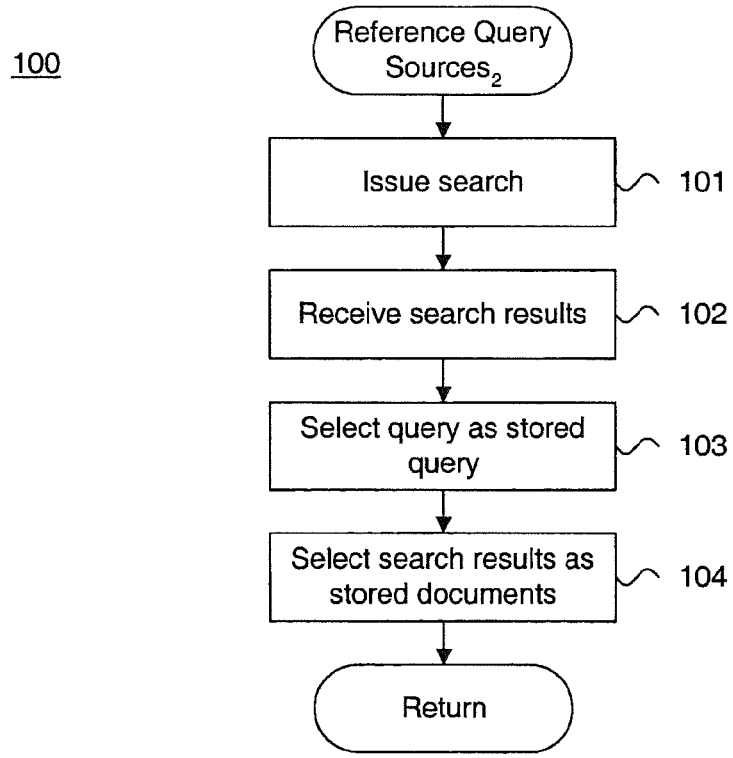

FIG. 7 is a flow diagram showing a routine 100 for performing precomputation based on a search results. The purpose of this routine is to identify a one-to-many pairing relationship between a search query 59 and a set of search results 60. The one-to-many relationship occurs when a set of search results are identified following the issuance of a search query 59.

The search is query issued (Block 101) and search results, consisting of search documents 60 (shown in FIG. 3), are received (Block 102). The actual search query 59 is selected as the stored query 40 (Block 103). The set of search documents 59 are selected as stored documents 41 (Block 104). Note that each search query is separately associated with only one search document and multiple search query-search document associations can be formed for any given search query. The routine then returns.

Query Source Referencing Using Tracked Queries

Figure 8:
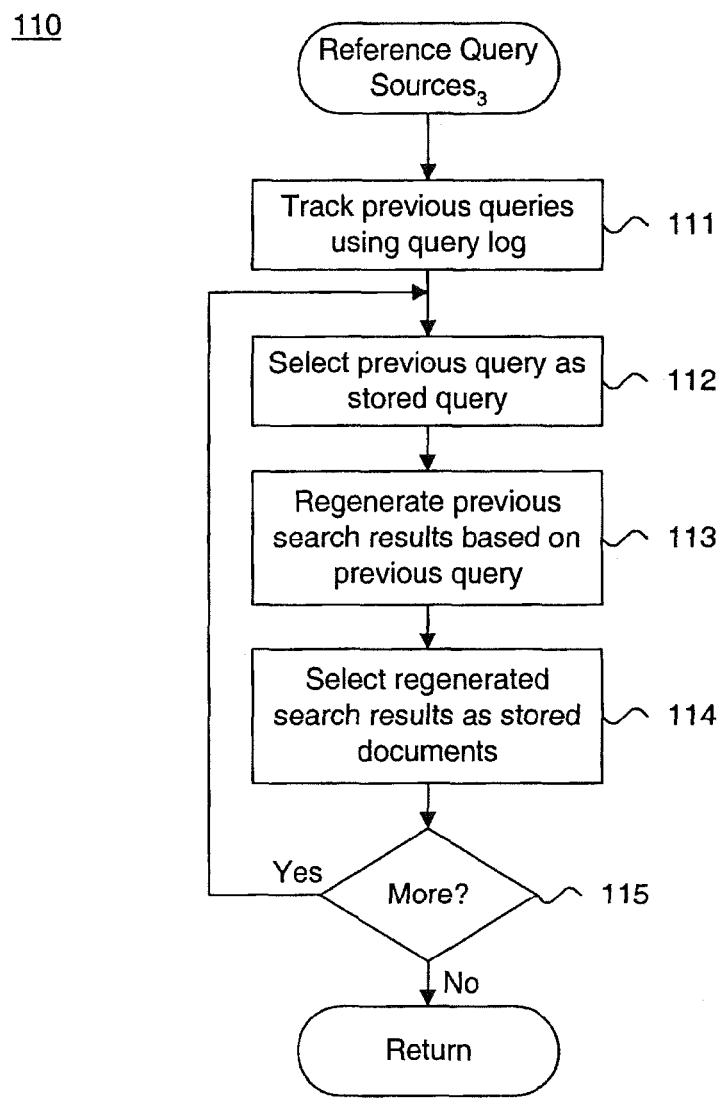

FIG. 8 is a flow diagram showing a routine 110 for performing precomputation based on previously tracked queries. The purpose of this routine is to reference the query log 26 (shown in FIG. 1) for previous search queries 27 and to regenerate search results based on those previously tracked queries 27.

Initially, previous search queries 27 are tracked using the query log 26 (Block 111). Each previous search query 27 is selected as a stored query 40 (Block 112) and search results based on the previous search query are regenerated (Block 113). The regenerated search results are selected as stored documents 41 (Block 114). Note that each previous search query is separately associated with only one regenerated search result document and multiple previous search query-regenerated search result document associations can be formed for any given previous search query. If further previous search queries 27 remain in the query log 26 (Block 115), processing continues with the next previous search query 27 (Block 112). Otherwise, the routine returns.

Query Source Referencing Using Cached Data

Figure 9:
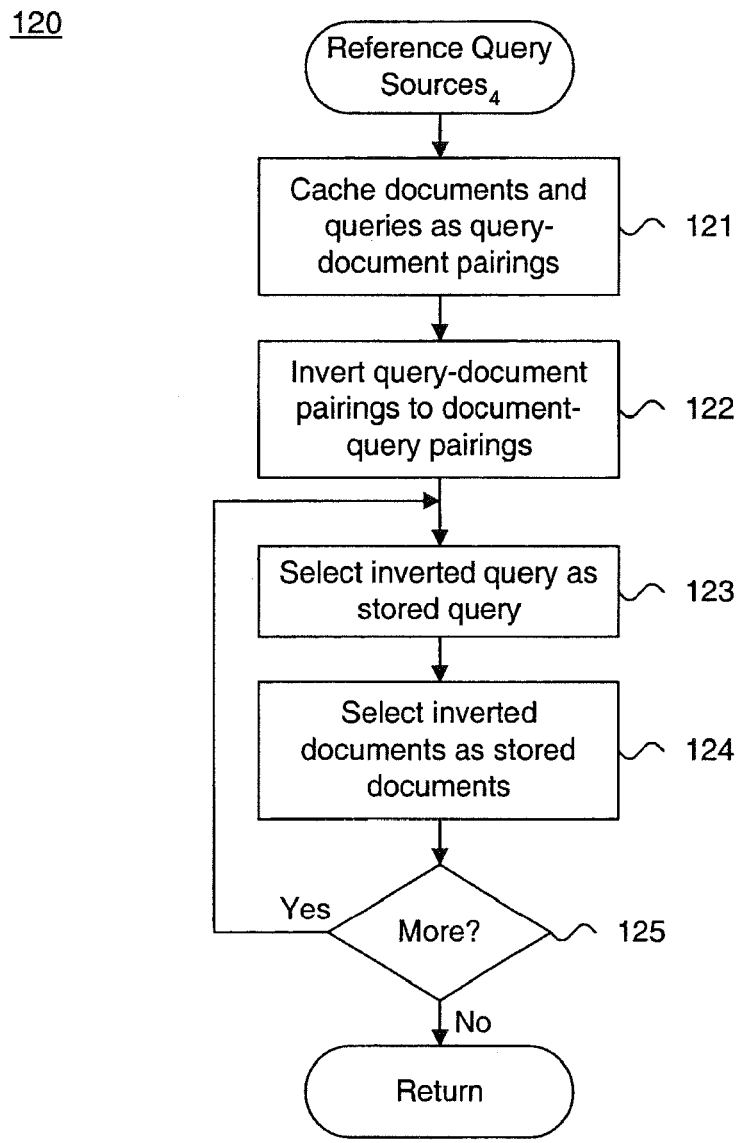

FIG. 9 is a flow diagram showing a routine 120 for performing precomputation based on cached documents and queries. The purpose of this routine is to invert pairings of cached document-cached queries maintained in the cache 23 for use as stored queries 40 and stored documents 41.

Cached documents 24 and cached queries 25 are maintained in the cache 23 (shown in FIG. 1). The cached documents 24 and cached queries 25 are organized in the cache 23 as cached query-cached document pairings. However, the associations 42 and weights 43 (shown in FIG. 3) are based on stored document-stored query pairings. Thus, the cached query-cached document pairings implicit in the organization of the cache 23 are inverted to form cached document-cached query pairings (Block 122). An inverted search query is selected as a stored query 40 (Block 123) and the corresponding inverted documents are selected as stored documents 41 (Block 124). Note that each inverted search query is separately associated with only one inverted document and multiple inverted search query-inverted document associations can be formed for any given inverted search query. If further cached query-cached documents pairings remain (Block 125), processing continues with the selection of the next inverted pairing (Block 123). Otherwise, if no further cached document-cached queries pairings remain (Block 125), the routine returns.

On-Line Query Refinements Routine

Figure 10:
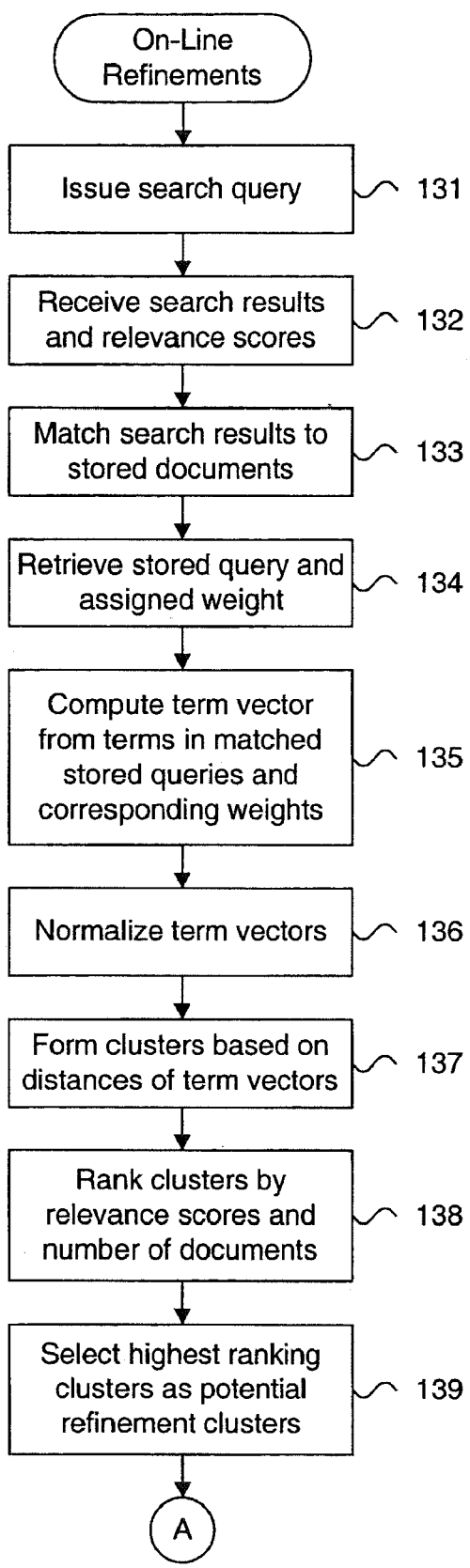
FIG. 10 is a flow diagram showing the routine for performing on-line query refinements for use in the method of FIG. 4.
Figure 10:
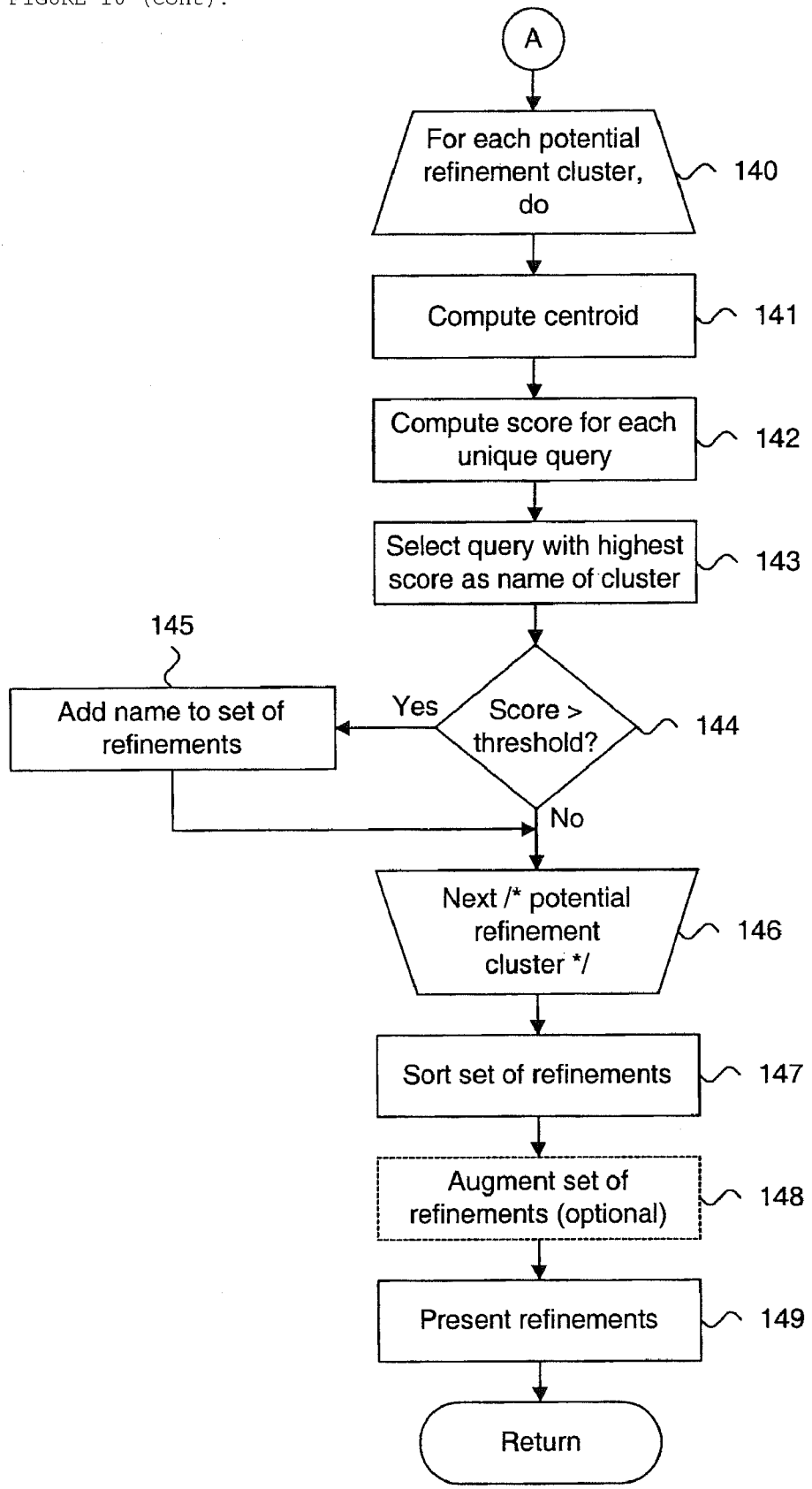

FIG. 10 is a flow diagram showing the routine 130 for performing on-line query refinements for use in the method 80 of FIG. 4. The purpose of this routine is to formulate one or more search query refinements 67 preferably on-line, which can be suggested following an actual search query 59 issuance.

Initially, a search query 59 is issued (Block 131) and search results, in the form of search documents 60, and relevance scores 61 are received (Block 132). If possible, the stored documents 41 are matched to the search results (Block 133). Ideally, at least one of the search results will match a stored document 41. However, as the association database 39 is preferably built as an off-line operation, the set of stored documents 41 may not fully match every possible search results. Accordingly, those search results, which do not have a matching stored document 41, are skipped.

Next, for each matched search result, the association 42 corresponding to the matched stored document 41 is determined and is used to retrieve the associated stored queries 40 and weights 43 (Block 134). A term vector 62 is then computed from the terms occurring in the matched stored queries 40 and corresponding weights 43 (Block 135). Each term vector 62 is a vector in multi-dimensional space, where each dimension corresponds to a distinct term and each term represents an individual word or word combination. The length of a term vector 62 in each dimension equals the sum of the weights of the corresponding term in the set of associated queries. Those term vector elements corresponding to the terms from the original search query 59 are multiplied by a constant factor to downwardly weight the terms to enforce independence from the original search query 59. The term vectors 62 are normalized (Block 136). In the described embodiment, the term vectors 62 are length normalized to a length of one, although other normalizations are possible, as would be recognized by one skilled in the art.

Clusters 63 are then formed based on the distances of the term vectors 62 from a common origin (Block 137). In the described embodiment, the clusters 62 are formed using a hierarchical agglomerative clustering algorithm, such as described in E. Rasmussen, described supra., the disclosure of which is incorporated by reference, although other forms of clustering could also be applied, as would be recognized by one skilled in the art.

The resulting clusters 63 are ranked using the relevance scores 61 assigned to the search documents 60 corresponding to the matched stored documents 41 and the number of stored documents 41 occurring in each cluster 63 (Block 138). The highest ranking clusters are selected as the potential refinement clusters 64 (Block 139). In the described embodiment, the potential refinement clusters 63 are selected based on a predefined threshold value, although other cluster selection criteria are possible, as would be recognized by one skilled in the art.

For each potential refinement cluster 64 (Block 140), a centroid 65 is computed (Block 141). Each centroid 65 represents the weighted center of the term vector 62 for each cluster 63, as a normalized sum of the product of the term vector 62 for each stored query 40 and the relevance score 61 assigned to the search documents 60 corresponding to the matched stored documents 41 of the original search query 59. Other approaches to computing centroids 65 could also be used, including using unweighted values and by varying the forms of weighting and averaging, as would be recognized by one skilled in the art.

A score 66 is then computed for each unique search query 59 occurring in the potential refinement cluster 64 (Block 143). Each score 66 is computed as the product of the frequency of the stored query 40 for the cluster 63 times the length of the distance vector measured from the term vector 62 of the stored query 40 to the centroid 65 of the cluster 63. Other forms of scoring, ordering and ranking are possible, as would be recognized by one skilled in the art. The stored query 40 with the highest score 66 is selected as the name of the cluster 63 (Block 143). Alternatively, other cluster naming selection criteria using highest, averaged, lowest, or other forms of scoring, ordering and ranking are possible, as would be recognized by one skilled in the art. If the score 66 for the unique stored query 40 exceeds a predefined threshold (Block 144), the name is added to the set of query refinements 67 (Block 145). Processing continues with each remaining potential refinement cluster 64 (Block 146).

Finally, the set of refinements 67 are sorted into rankings (Block 147) as a function of the relevance scores 61 assigned to the search documents 60 corresponding to the matched stored documents 41 appearing in each cluster 63 plus the size of the cluster 63 in number of stored documents 41. As an optional step, the set of refinements 67 are augmented with supplemental queries (Block 148). In the described embodiment, each supplemental query consists of the terms originally appearing in the search query 59 and negated forms of all terms appearing in the set of refinements 67, but not appearing in the original search query. Other forms of augmenting the set of refinements 67 are feasible, as would be recognized by one skilled in the art. The set of refinements 67 are presented (Block 149) based on the rankings and, optionally, cluster scores. The routine then returns.

Integrating Candidate Query Refinements Routine

Figure 11:
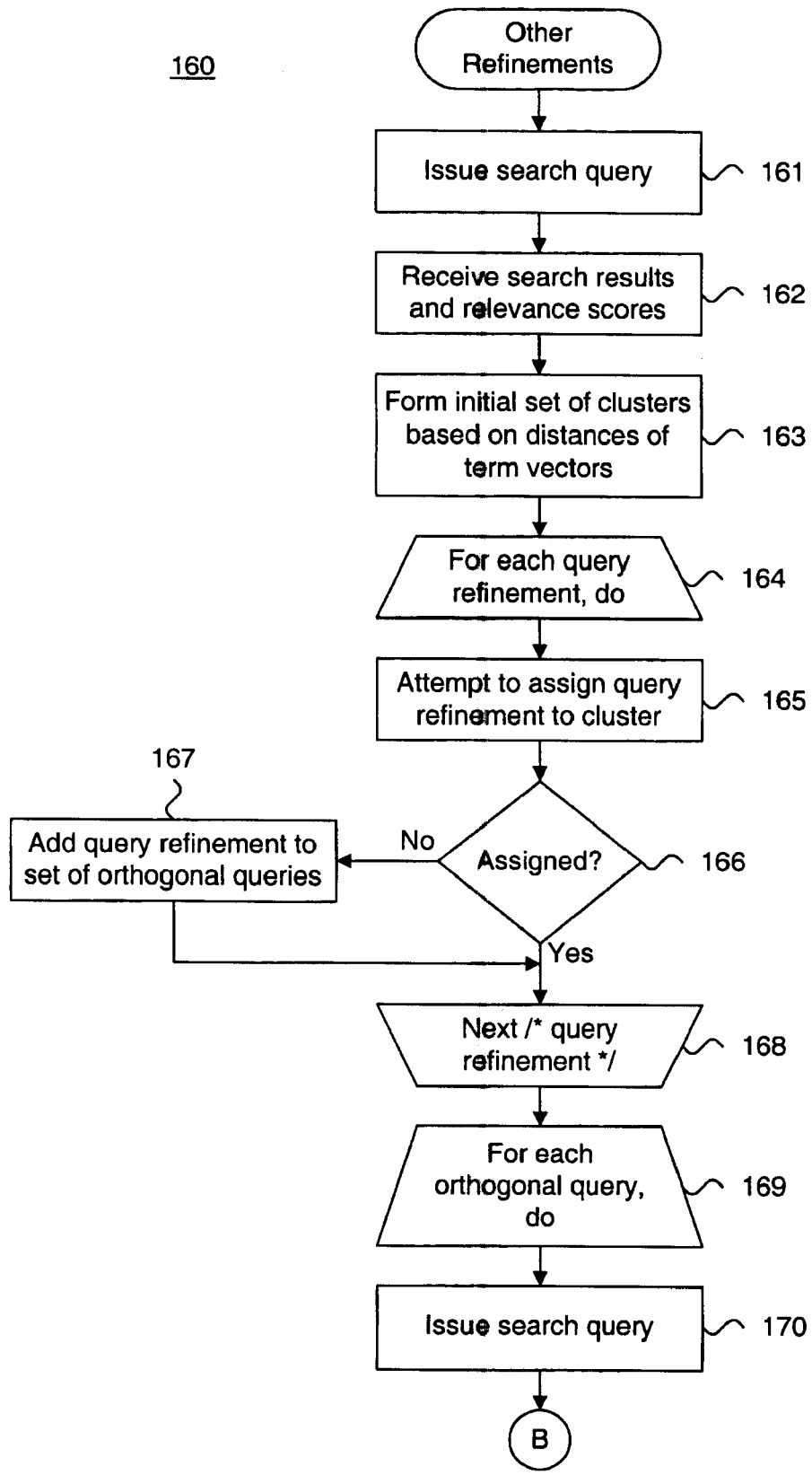
FIG. 11 is a flow diagram showing a routine for integrating candidate query refinements for use in the method of FIG. 4, in accordance with a further embodiment.
Figure 11:
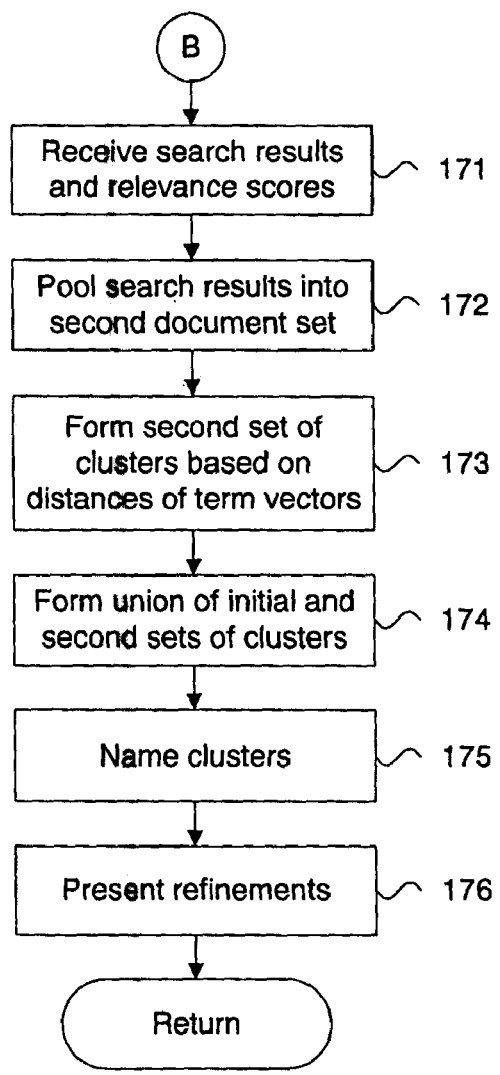

FIG. 11 is a flow diagram showing a routine 160 for integrating candidate query refinements for use in the method 80 of FIG. 4, in accordance with a further embodiment. The purpose of this routine is to formulate one or more search query refinements 67, which can be suggested by integrating candidate query refinements 68. The candidate query refinements 68 can originate from any external source, as would be recognized by one skilled in the art, including the user 19 as user-specified query refinements, third parties, and other approaches to attempting to remedy poorly-framed search queries. For brevity, those detailed operations previously presented above with reference to FIG. 10 are described in summary fashion where applicable.

By way of example, other approaches attempt to remedy poorly-framed search queries by suggesting refinements, which can be considered and selected by a user as an adjunct to or in lieu of the original search query. One approach suggests previous, recurring search queries, which contain the terms used in the original search query, along with other terms. However, the suggested queries can overlap in meaning with the original search query and word co-occurrences and frequencies poorly divide the search space into conceptually independent partitions. Another related approach tracks search query refinements entered by other users and suggests frequently-used refinements to modify the original search query. However, reliance on only frequently occurring refinements can also poorly divide the search space into conceptually independent partitions. Yet another related approach clusters documents received in response to an original search query based on the terms occurring in each document. The terms that characterize each of the clusters are used as cluster names and suggested as refinements. However, the resulting refinements often consist of terms not generally occurring in a user-specified search query and, as a result, can be difficult to understand and can perform poorly when used as a search query.

Initially, as before, a search query 59 is issued (Block 161) and search results, in the form of search documents 60, and relevance scores 61 are received (Block 162). Following search results matching and term vector computation and normalization, an initial set of clusters 63 is formed based on the distances of the term vectors 62 (Block 163). For each candidate query refinement 68 (Block 164), an attempt is made to assign the candidate query refinement 68 to one of the clusters 63 (Block 165). If the candidate query refinement 68 is not assigned to a cluster 63 (Block 166), the candidate query refinement 68 is added to a set of orthogonal queries (Block 167). Processing continues with each remaining candidate query refinement 68 (Block 168).

Next, for each candidate query refinement 68 in the set of orthogonal queries (Block 169), a search query 59 is issued (Block 170) and search results, in the form of search documents 60, and relevance scores 61 are again received (Block 171). The search results are pooled into a second set of documents (Block 172). Following search results matching and term vector computation and normalization, a second set of clusters 63 is formed based on the distances of the term vectors 62 (Block 173). A union is formed of the initial and second sets of clusters 63 (Block 174). Following cluster ranking, potential refinement cluster 64 selection, centroid 65 computation, and unique query scoring, the clusters 63 in the union are named for the unique queries with the highest scores (Block 175). Finally, the set of refinements 67 are presented (Block 149) based on the rankings and, optionally, cluster scores. The routine then returns.

Query Refinement Example

By way of example, a user 19 might submit a search query 59, which includes the individual word, "jaguar." Upon issuance, a set of search documents 60 are received and the top 100 documents are chosen for clustering. Note a set of 100 documents is used merely for the purposes of illustration and any other limit would be equally suitable, as would be recognized by one skilled in the art. The search documents 60 might naturally identify several relevant semantic groupings, including documents about automobiles manufactured by Jaguar Corporation, including hyperlink references to the official Jaguar Corporation Websites in the United States and United Kingdom and a Jaguar brand automobile owners association. The semantic groupings might also include documents about the Macintosh operating system version codenamed jaguar, documents about jaguar animals, as well as documents about a number of other miscellaneous topics that may not be groupable into cohesive document clusters 63.

During the clustering phase, term vectors 62 are computed for each of the top 100 documents ranked by relevance score. As above, a set of 100 documents is used merely for the purposes of illustration and any other limit would be equally suitable, as would be recognized by one skilled in the art. Each selected search document 60 is matched to a stored document 41 in the association database 39 and the corresponding stored queries 40 are determined by looking up the associations 42 for each matched stored document 41. The term vectors 62 are formed by flattening the constituent terms for each corresponding stored query 40 into a simple vector space. Clusters 63 are generated from the term vectors 62, which typically extracts the relevant semantic groupings, such as those groupings described above.

A cluster centroid 65 is calculated for each cluster 63. All search queries 59 associated with a search document 60 in the cluster 63 are scored according to the distance from the cluster centroid 65 and the percent of stored documents 41 occurring in the cluster 63 with which each stored document 41 is associated. For instance, assume that a cluster 63 is calculated for the example "jaguar" search query 59 for the semantic grouping containing documents about Jaguar brand automobiles. In the corresponding cluster centroid 65, the dominant terms include words, such as "jaguar," "automobile," "auto," "car," "USA," "UK," and so forth. The best matching query name suitable as a suggested query refinement 67 would be "jaguar car," which has good coverage over the entire cluster 63 and also contains the two terms having a highest weight in the cluster centroid 65.

Similarly, further assume that a cluster 63 is calculated for the semantic grouping containing documents about the Macintosh code-named jaguar operating system. In the corresponding cluster centroid 65, the dominant terms include words, such as "jaguar," "X," "Mac," "OS," and so forth. The best matching query name suitable as a suggested query refinement 67, assuming case insensitivity, would be "mac os x jaguar," which contains all of the top search query terms and appears in many of the documents in the cluster 63. Other generated clusters 63 and query names suitable as suggested query refinement 67 include "jaguar racing" for documents about Jaguar automobile racing clubs and "jaguar cat" for documents about the jaguar animal.

Finally, the refinements 67 are sorted as a function of the relevance scores 61 assigned to the search documents 60 corresponding to the matched stored documents 41 appearing in each cluster 63 plus the size of the cluster 63 in number of stored documents 41. A cluster 63 will be ranked higher than another cluster 63 if the cluster 63 is either larger or has stored documents 41 having higher relevance scores 61. In the example, the final ranking of the refinements 67 includes "jaguar car," "mac os x jaguar," "jaguar racing," and "jaguar cat." The rankings and, optionally, cluster scores are used for presentation purposes.

In a further embodiment, the refinements 67 would include negated forms of all terms appearing in the set of refinements 67, but not appearing in the original search query. Thus, the alternative refinements 67 include "jaguar -car -mac-os-x -racing -cat." In a still further embodiment, a predetermined set of search queries 59 selected from past user queries could be used to precompute possible sets of refinements 67 for the predetermined queries. The predetermined queries would be issued and the search results would be maintained in a database for look up in response to user search requests based on the predetermined queries.

While the invention has been particularly shown and described as referenced to the embodiments thereof, those skilled in the art will understand that the foregoing and other changes in form and detail may be made therein without departing from the spirit and scope of the invention.

What is claimed is:

1. A method, performed by one or more server devices, the method comprising:
storing, in a memory of the one or more server devices, search query-search document associations, each search query-search document association representing a one-to-one pairing of an issued search query and a search document retrieved based on the issued search query;
receiving, by one or more processors of the one or more server devices, a search query;
identifying, by one or more processors of the one or more server devices, a set of search result documents using the received search query;
forming, by one or more processors of the one or more server devices, a plurality of clusters of search documents, of the stored search query-search document associations, that match the identified set of search result documents;
selecting, by one or more processors of the one or more server devices, at least one of the plurality of clusters;
computing, by one or more processors of the one or more server devices, a centroid for each of the selected at least one of the plurality of clusters;
computing, by one or more processors of the one or more server devices, a score for each unique issued search query associated with a document in the selected at least one of a plurality of clusters based on the computed centroid;
formulating, by one or more processors of the one or more server devices, a search query refinement suggestion based on the compound scores; and
sorting, by one or more processors of the one or more server devices, the formulated search query refinement suggestion among a group of search query refinement suggestions.

2. The method of claim 1, further comprising:
assigning weights to the search query-search document associations in the database based on relevancies of the search documents to the issued search queries in the search query-search document associations; and
storing the weights.

3. The method of claim 2, where the formulating the search query refinement suggestion further comprises:
computing term vectors using terms in the issued search queries of the search query-search document associations and the assigned weights.

4. The method of claim 3, where the formulating the search query refinement suggestion further comprises:
normalizing the term vectors; and
forming the clusters based on distances of each of the normalized term vectors from a common origin.

5. The method of claim 4, where the formulating the search query refinement suggestion further comprises:
multiplying, by a constant, those of the normalized term vectors that include constituent terms with the received search query to downwardly weight the constituent terms to produce an independence of the clusters from the terms of the received search query.

6. The method of claim 4, further comprising:
assigning a relevance score to the at least one search result document,
where the formulating the search query refinement suggestion further includes:
ranking the clusters based on the relevance score and a number of identified search documents in the clusters.

7. The method of claim 6, where the selecting at least one of the clusters comprises:
selecting at least one of the clusters based on the ranking. search query in the selected at least one of the clusters based on the centroids.

8. The method of claim 1, where the computing the score for each of the unique search queries comprises:
multiplying a frequency of the issued search queries in the search query-search document associations in the selected at least one of the clusters times a length of a distance vector measured from the term vectors of the issued search queries in the search query-search document associations to the centroids of the selected at least one of the clusters.

9. The method of claim 1, where the formulating the search query refinement suggestion further comprises:
designating a name to each of the selected at least one of the clusters based on the computed scores of the unique search queries of the selected at least one of the clusters.

10. The method of claim 9, where the formulating the search query refinement suggestion further comprises:
comparing the computed scores of the unique search queries of the named clusters to a threshold; and
selecting those cluster names with the computed score that exceeds the threshold to obtain the search query refinement suggestions.

11. The method of claim 10, where the sorting the formulated search query refinement suggestion further comprises:
sorting the formulated search query refinement suggestion among the group of search query refinement suggestions based on a relevance score assigned to each of the search result documents coffesponding to the identified search documents associated with the named clusters and a number of the identified search documents in the named clusters to obtain a sorted set of search query refinement suggestions.

12. The method of claim 11, further comprising:
presenting the sorted search query refinement suggestions to a user.

13. The method of claim 11, further comprising:
augmenting the sorted set of search query refinement suggestions with supplemental queries that include one or more of the terms of the search query and negated forms of all terms appearing in the set of search query refinement suggestions, but not appearing in the search query; and
presenting the augmented search query refinement suggestions to a user.

14. A system comprising:
means for storing search query-search document associations in a memory, each search query-search document association representing a one-to-one pairing of a stored search query and a search document retrieved based on the stored search query;
means for receiving a search query;
means for identifying a set of search result documents using the received search query;
means for forming a plurality of clusters of search documents, of the search query-search document associations, that are associated with the identified set of search result documents;
means for selecting at least one of the plurality of clusters;
means for computing a centroid for each of the selected at least one of the plurality of clusters;
means for computing a score for each unique stored search query asociated with a document in the selected at least one of a plurality of clusters based on the computed centroid;
means for formulating a search query refinement suggestion based on the computed scores; and
means for sorting the formulated search query refinement suggestion among a group of search query refinement suggestions.

15. The system of claim 14, where the means for formulating the search query refinement suggestion includes:
means for identifying search documents of the search query-search document association that match the at least one search result document within the database; and
means for using the issued search queries associated with the identified search documents in the formulating.

16. The system of claim 15, further comprising:
means for assigning weights to the search query-search document associations in the database based on relevancies of the search documents to the issued search queries in the search query-search document associations; and
means for storing the weights in the database.

17. A computer-readable memory device to store instructions executable by at least one processor to cause the at least one processor to:
store search query-search document associations, each search query-search document association representing a one-to-one pairing of an issued search query and a search document retrieved based on the issued search query;
receive a search query;
identify a set of search result documents using the received search query;
form a plurality of clusters of search documents, of the stored search query-search document associations, that are associated with the identified set of search result documents;
select at least one of the plurality of clusters;
compute a centroid for each of the selected at least one of the plurality of clusters:
compute a score for each unique issued search query associated with a document in the selected at least one of a plurality of clusters based on the computed centroid;
formulate a search query refinement suggestion based on the computed scores; and
sort the formulated search query refinement suggestion among a group of search query refinement suggestions.

18. The computer-readable memory device of claim 17, further comprising one or more instructions to cause the at least one processor to:
normalize the term vectors; and
form clusters of the identified search documents based on distances of each of the normalized term vectors from a common origin
identify search documents of the search query-search document associations that match the at least one of the search result documents; and
use the issued search queries, associated with the issued search documents, in the formulating.

19. The computer-readable memory device of claim 18, further comprising one or more instructions to cause the at least one processor to:
assign weights to the search query-search document associations in the database based on relevancies of the search documents to the issued search queries in the search query-search document associations; and
store the weights.

20. A method, performed by one or more server devices, the method comprising:
storing, in a memory of the one or more server devices, a plurality of query-document associations, each query-document association including a one-to-one pairing of an issued search query and a stored search document that was retrieved based on the issued search query;
receiving, by one or more processors of the one or more server devices, a search query from a client device;

identifying, by one or more processors of the one or more server devices, a set of search result documents using the received search query;

identifying, by one or more processors of the one or more server devices, search result documents in the identified set of search result documents that match stored search documents;

forming, by one or more processors of the one or more server devices, a plurality of clusters of the search documents, of the stored plurality of query-document associations, that match the search result documents;

selecting, by one or more processors of the one or more server devices, at least one of the plurality of clusters;

computing, by one or more processors of the one or more server devices, a centroid for each of the selected at least one of the plurality of clusters;

computing, by one or more processors of the one or more server devices, a score for each unique issued search query associated with a document in the selected at least one of a plurality of clusters based on the computed centroid;

identifying, by one or more processors of the one or more server devices, for a stored search document of the selected at least one of the plurality of clusters, a query-document association in the plurality of query-document associations based on the computed scores;

formulating, by one or more processors of the one or more server devices, a search query refinement suggestion for the received search query based on an issued search query of the identified query-document association; and sorting, by one or more processors of the one or more sever devices, the formulated search query refinement suggestion among a group of search query refinement suggestions.

21. The method of claim 20, further comprising:
assigning weights to the stored query-document associations based on relevancies of the search documents to the issued search queries in the query-document associations; and
storing the assigned weights.

22. The method of claim 21, where the formulating the search query refinement suggestion further comprises:
computing term vectors using terms in the issued search queries of the identified query-document associations and the assigned weights.

23. The method of claim 22, where the formulating the search query refinement suggestion further comprises:
normalizing the term vectors; and
forming clusters of the search documents in the identified query-document associations based on distances of each of the normalized term vectors from a common origin.

24. The method of claim 23, where the formulating the search query refinement suggestion further comprises:
multiplying, by a constant, those of the normalized term vectors that include constituent terms with the received search query to downwardly weight the constituent terms to produce an independence of the clusters from the terms of the received search query.

25. The method of claim 23, further comprising:
assigning a relevance score to the search result documents, where the formulating the search query refinement suggestion further includes:
ranking the clusters based on the relevance score and a number of search documents in the clusters.

26. The method of claim 25, where the formulating the search query refinement suggestion further comprises:
selecting ones of the clusters based on the ranking.

27. The method of claim 20, where the computing the score for each of the unique search queries comprises:
multiplying a frequency of the issued search queries in the identified query-document associations in the selected clusters times a length of a distance vector measured from the term vectors of the issued search queries in the identified query-document associations to the centroids of the selected clusters.

28. The method of claim 20, where the formulating the search query refinement suggestion further comprises:
designating a name to each of the selected clusters based on the computed scores of the unique search queries of the selected clusters.

29. The method of claim 28, where the formulating the search query refinement suggestion further comprises:
comparing the computed scores of the unique search queries of the named clusters to a threshold; and
selecting those cluster names that exceed the threshold to obtain the search query refinement suggestions.

30. The method of claim 29, where the sorting the formulated the search query refinement suggestion further comprises:
sorting the formulated search query refinement suggestions based on a relevance score assigned to each of the search result documents corresponding to the search documents in the query-document associations associated with the named clusters and a number of the search documents in the named clusters.

31. The method of claim 30, further comprising:
presenting the sorted search query refinement suggestions to a user.

32. The method of claim 30, further comprising:
augmenting the sorted search query refinement suggestions with supplemental queries that include one or more of the terms of the search query and negated forms of all terms appearing in the set of search query refinement suggestions, but not appearing in the search query; and
presenting the augmented search query refinement suggestions to a user.

33. A system comprising:
means for storing a plurality of query-document associations, each query-document association including a one-to-one pairing of a search query and a search document retrieved based on the search query;
means for receiving a search query;
means for identifying a set of search result documents using the received search query;
means for identifying search result documents in the identified set of search result documents that match one or more of the stored search documents;
means for forming a plurality of clusters based on the stored search documents that match search result documents in the identified set of search result documents;
means for selecting at least one of the plurality of clusters;
means for computing a centroid for each of the selected at least one of the plurality of clusters;
means for computing a score for each unique stored search query associated with a document in the selected at least one of a plurality of clusters based on the computed centroid;
means for identifying, for a search result document of the selected at least one of the plurality of clusters, a search query of a query-document association of the plurality of query-document associations that corresponds to the identified search result document based on the computed scores;

means for formulating a search query refinement suggestion for the received search query based on the identified search query, and means for sorting the formulated search query refinement suggestion among a group of search query refinement suggestions.

34. The system of claim 33, further comprising:
means for using the search queries associated with the identified query-document associations in the formulating.

35. The system of claim 34, further comprising:
means for assigning weights to the stored query-document associations based on relevancies of the search documents to the search queries in the query-document associations; and means for storing the assigned weights.

36. A method, performed by one or more server devices, the method comprising:
creating, by one or more processors of the one or more server devices, a query source reference, including:
identifying, by one or more processors of the one or more server devices, associations between issued search queries and retrieved search documents in a one-to-one relation, and assigning, by one or more processors of the one or more server devices, a weight to each of the associations;
receiving, by one or more processors of the one or more server devices, a search query; forming, by one or more processors of the one or more server devices, a plurality of clusters based on the query source reference;
selecting, by one or more processors of the one or more server devices, at least one of the plurality of clusters;
computing, by one or more processors of the one or more server devices, a centroid for each of the selected at least one of the plurality of clusters;
computing, by one or more processors of the one or more server devices, a score for each unique issued search query associated with a document in the selected at least one of a plurality of clusters based on the computed centroid;
formulating, by one or more processors of the one or more server devices, a refinement suggestion for the received search query based on the computed scores; and sorting, by one or more processors of the one or more server devices, the formulated search query refinement suggestion among a group of search query refinement suggestions.

37. The method of claim 36, further comprising:
obtaining at least one search result document using the received search query,
where the formulating the search query refinement suggestion further comprises:
comparing the at least one search result document to the retrieved search documents,
identifying the retrieved search documents that match the at least one search result document, and
using the issued search queries associated with the identified search documents in the formulating.

38. The method of claim 37, where the formulating the search query refinement suggestion further comprises:
computing term vectors using terms in the issued search queries associated with the identified search documents and the assigned weights.

39. The method of claim 38, where the formulating the search query refinement suggestion further comprises:
ranking the search query refinement suggestion based on the computed term vectors,
where the method further comprises:
presenting the ranked search query refinement suggestion to a user.

40. A system comprising:
a memory; and
a processor to:
store, in the memory, search query-search document associations, each search query-search document association representing a one-to-one pairing of an issued search query and a search document retrieved based on the issued search query;
receive a search query;
identify a set of search result documents using the received search query;
form a plurality of clusters of search documents, of the stored search query-search document associations, that match the identified set of search result documents;
select at least one of the plurality of clusters;
compute a centroid for each of the selected at least one of the plurality of clusters;
compute a score for each unique issued search query associated with a document in the selected at least one of a plurality of clusters based on the computed centroid;
formulate a search query refinement suggestion based on the scores; and
sort the formulated search query refinement suggestion among a group of search query refinement suggestions.

41. The system of claim 40, where the processor is further to:
assign weights to the search query-search document associations in the database based on relevancies of the search documents to the issued search queries in the search query-search document associations; and
store the weights.

42. The system of claim 41, where, when formulating the search query refinement suggestion, the processor is further to:
compute term vectors using terms in the issued search queries of the search query-search document associations and the assigned weights.

43. The system of claim 42, where, when formulating the search query refinement suggestion, the processor is further to:
normalize the term vectors; and
form the clusters based on distances of each of the normalized term vectors from a common origin.

44. The system of claim 43, where, when formulating the search query refinement suggestion, the processor is further to:
multiply, by a constant, those of the normalized term vectors that include constituent terms with the received search query to downwardly weight the constituent terms to produce an independence of the clusters from the terms of the received search query.

45. The system of claim 43, where the processor is further to:
assign a relevance score to the at least one search result document, where, when formulating the search query refinement suggestion, the processor is further to:
rank the clusters based on the relevance score and a number of identified search documents in the clusters.

46. The system of claim 45, where, when selecting at least one of the clusters, the processor is further to:
   select at least one of the clusters based on the ranking.

47. The system of claim 40, where, when computing the score for each of the unique search queries, the processor is flirther to: multiply a frequency of the issued search queries in the search query-search document associations in the selected at least one of the clusters times a length of a distance vector measured from the term vectors of the issued search queries in the search query-search document associations to the centroids of the selected at least one of the clusters.

48. The system of claim 40, where, when formulating the search query refinement suggestion, the processor is further to:
   designate a name to each of the selected at least one of the clusters based on the computed scores of the unique search queries of the selected at least one of the clusters.

49. The system of claim 48, where, when formulating the search query refinement suggestion, the processor is further to: compare the computed scores of the unique search queries of the named clusters to a threshold; and
   select those cluster names with the computed score that exceeds the threshold to obtain the search query refinement suggestions.

50. The system of claim 49, where, when sorting the formulated search query refinement suggestion, the processor is further to:
   sort the formulated search query refinement suggestion among a group of search query refinement suggestions based on a relevance score assigned to each of the search result documents corresponding to the identified search documents associated with the named clusters and a number of the identified search documents in the named clusters to obtain a sorted set of search query refinement suggestions.

51. The system of claim 50, where the processor is further to:
   present the sorted search query refinement suggestions to a user.

52. The system of claim 50, where the processor is further to:
   augment the sorted set of search query refinement suggestions with supplemental queries that include one or more of the terms of the search query and negated forms of all terms appearing in the set of search query refinement suggestions, but not appearing in the search query; and
   present the augmented search query refinement suggestions to a user.

* * * * *

UNITED STATES PATENT AND TRADEMARK OFFICE
CERTIFICATE OF CORRECTION

| | | |
|---|---|---|
| PATENT NO. | : 8,086,619 B2 | Page 1 of 1 |
| APPLICATION NO. | : 10/668721 | |
| DATED | : December 27, 2011 | |
| INVENTOR(S) | : Paul Haahr et al. | |

It is certified that error appears in the above-identified patent and that said Letters Patent is hereby corrected as shown below:

IN THE CLAIMS:

Column 14, line 23, claim 1, reads "based on the compound scores; and", but should read --based on the computed scores; and--.

Column 14, lines 61 and 62, claim 7, please delete both lines.

Column 16, line 31, claim 17, after "clusters" please delete ":" and replace it with ";".

Signed and Sealed this
Seventh Day of February, 2012

David J. Kappos
*Director of the United States Patent and Trademark Office*